Figure 3:
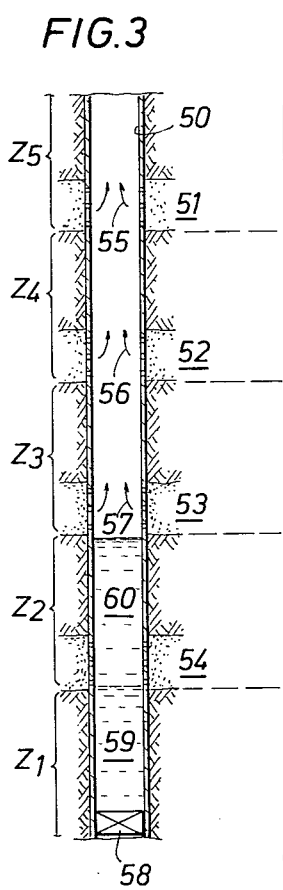

United States Patent [19]

Anderson et al.

[11] 3,954,006

[45] May 4, 1976

[54] METHODS FOR DETERMINING VELOCITIES AND FLOW RATES OF FLUIDS FLOWING IN WELL BORE

[75] Inventors: Ronald A. Anderson; James J. Smolen, both of Houston, Tex.

[73] Assignee: Schlumberger Technology Corporation, New York, N.Y.

[22] Filed: Jan. 31, 1975

[21] Appl. No.: 545,859

[52] U.S. Cl. ................................................. 73/155
[51] Int. Cl.² ......................................... E21B 47/10
[58] Field of Search ....................... 73/155, 229, 198

[56] References Cited
UNITED STATES PATENTS

| | | | |
|---|---|---|---|
| 2,652,720 | 9/1953 | Piety .................................... | 73/155 |
| 2,706,406 | 4/1955 | Vincent et al. ........................ | 73/155 |

*Primary Examiner*—Jerry W. Myracle
*Attorney, Agent, or Firm*—Ernest R. Archambeau, Jr.; William R. Sherman; Stewart F. Moore

[57] ABSTRACT

In the several representative embodiments of the new and improved methods disclosed herein, a cable-suspended spinner-type flowmeter is successively lowered and raised at selected speeds in a well bore containing one or more flowing fluids whose velocity or flow rate are to be determined. In one manner of practicing the invention, the flowmeter is passed back and forth through a lower static well bore interval for establishing the response of the tool at zero flow rates. In this way the output measurements obtained from the runs through the higher or dynamic intervals can be uniquely correlated for accurately determining the velocity and flow rate of the well bore fluids in each dynamic interval independently of differences in fluid viscosity. In another manner of practicing the invention, output measurements obtained upon passing the flowmeter back and forth through a dynamic well bore zone in which the fluids are flowing at a known rate are used for accurately determining the velocity and flow rate in the other dynamic well bore intervals.

33 Claims, 20 Drawing Figures

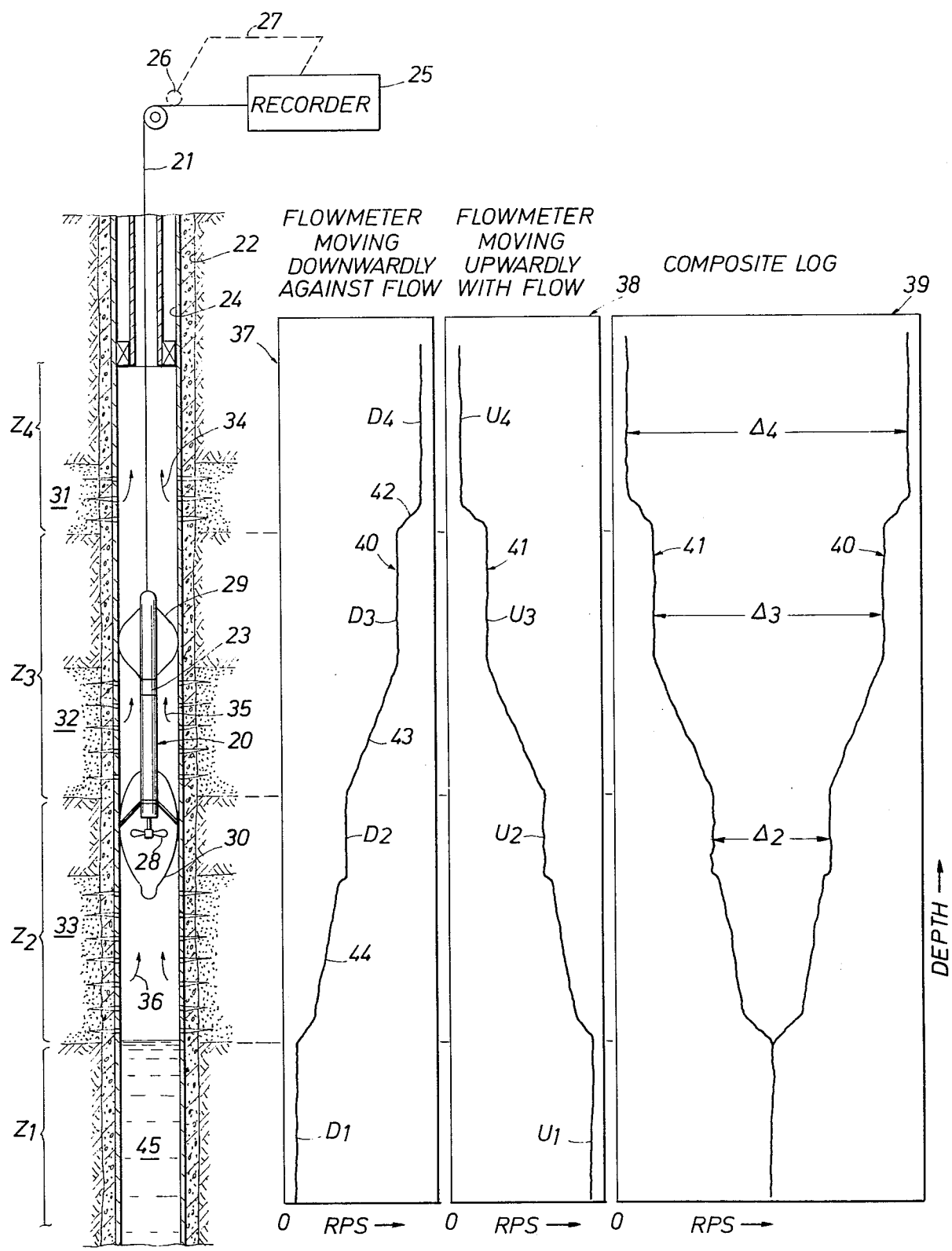

DOWN

UP

COMPOSITE LOG

DOWN

UP

COMPOSITE LOG

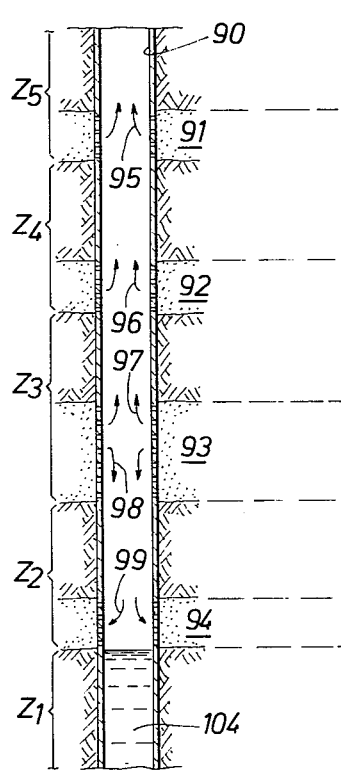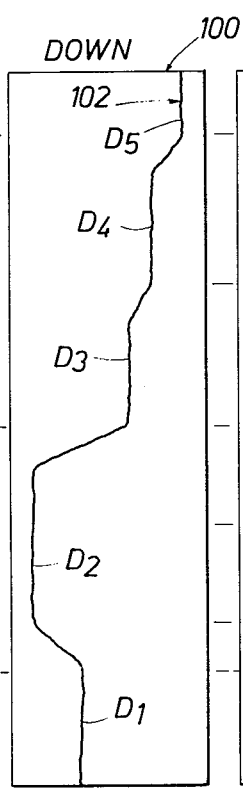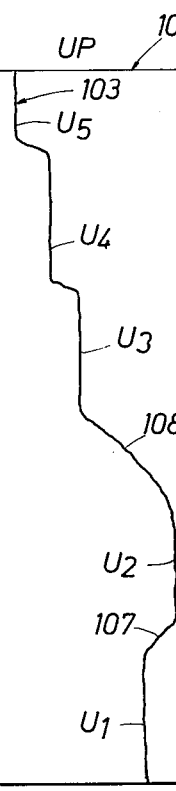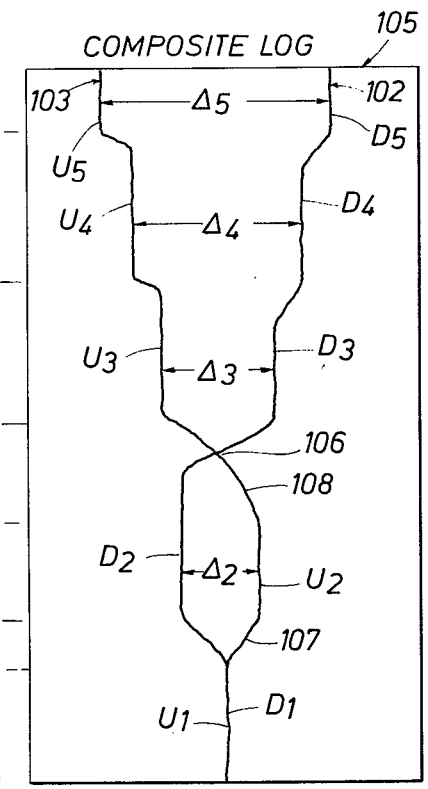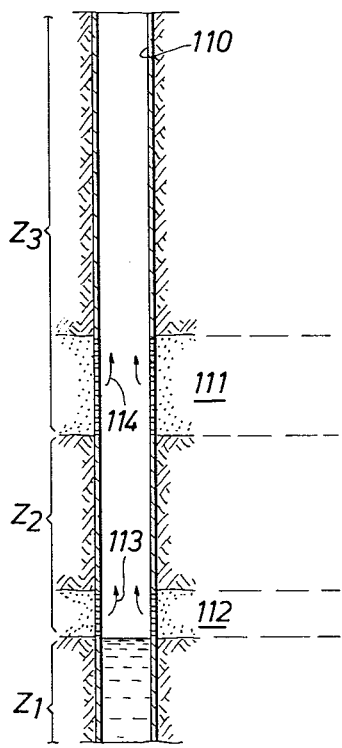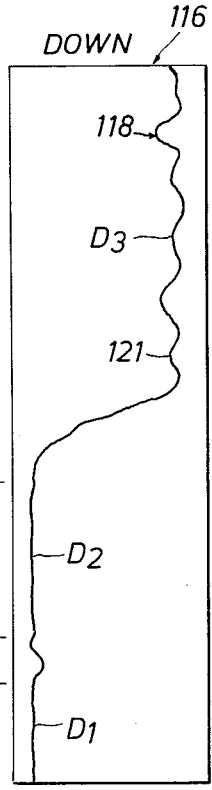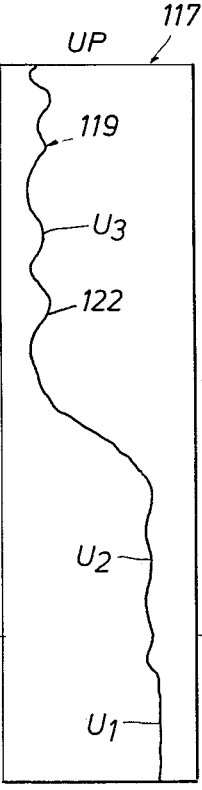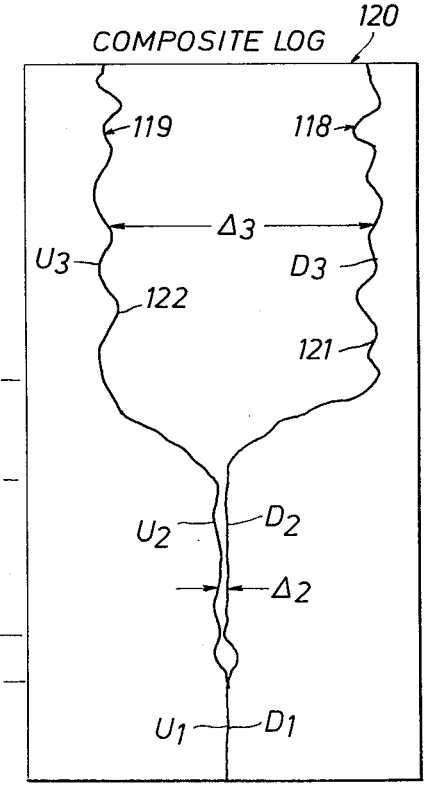

METHODS FOR DETERMINING VELOCITIES AND FLOW RATES OF FLUIDS FLOWING IN WELL BORE

As described in U.S. Pat. No. 3,630,078, one of the most-successful techniques presently employed for determining the flow rate of fluids flowing in a well bore is to pass a so-called "spinner-type" flowmeter tool at a constant speed through the fluid-filled well bore. By successively recording the resulting rotational speeds of the flowmeter spinner at the corresponding depth locations of the tool, a continuous flow-survey or fluid-velocity log will be obtained from which the flow rates of the well bore fluids at different depth intervals of the well bore can be readily determined to prepare a representative flow profile of that well. Thus, where the well being surveyed is a production well having two or more production intervals, the resulting flow profile will clearly indicate the respective velocities or flow rates of the connate fluids which are being produced from each of the several producing intervals. On the other hand, where the well is an injection well in which fluids are being injected simultaneously into two or moe formation intervals, the resulting flow profile will show what portion of the injection fluids is entering each formation interval.

Those skilled in the art will, of course, appreciate that the rotational speed of the spinner in a flowmeter of this nature is simply a linear function of the apparent or relative velocity of the well bore fluids in relation to the tool. Furthermore, the spinner will rotate at the same speed whether the tool is stationary and the well bore fluids are flowing past the tool at a given velocity or the tool is moving at the same velocity through a static column of the fluids. Accordingly, as is typical, by moving the flowmeter tool counter to the flowing fluids, there will be an increased relative velocity which will cause the spinner to turn at higher speeds to provide more-accurate measurements. This typical practice will at least minimize the errors which would otherwise occur if the relative fluid velocity is so low that viscous drag or frictional losses will cause the spinner to no longer operate in a linear range as well as slow significantly, if not stop altogether, at minimum velocities. Since the output signals from these flowmeters are only representative of the rotational speeds of the spinner, appropriate corrections must, of course, be made to properly take into account the viscosity of the fluids for determining the actual flow rates.

To make these corrections, one calibration technique which has been commonly used heretofore is to shut the well in and then move the flowmeter at two or more selected constant travel speeds through the static column of well bore fluids. The resulting data will, of course, provide a corresponding number of points defining a straight-line plot of relative fluid velocity versus the rotational speed of the spinner. Thus, data from subsequent logging runs in that well can presumably be used to compute the actual fluid velocities and flow rates at different depths while the well bore fluids are flowing. However, it is recognized that calibration of a flowmeter under static or shut-in conditions is not always fully reliable since the well bore conditions may change significantly when the fluids are flowing. There are, of course, also many situations where a given well cannot be shut in for one reason or another.

Accordingly, it has generally been preferred heretofore to calibrate a flowmeter tool of this nature by making a series of measuring runs while normal flow conditions are maintained in the well bore. Conventionally, these runs are made at three to five widely-different but respectively-constant tool speeds, with all of these measurement runs being made counter to the flow direction of the well bore fluids so as to achieve maximum relative fluid velocities across the spinner. The average measured rotational speeds of the spinner and the tool velocity for each run are then typically plotted on linear graph paper, with the spinner speed customarily being scaled along the Y-axis and the tool velocity being in convenient units along the X-axis. If the various measurements are sufficiently accurate, the resulting data obtained between each perforated well bore interval will substantially fall along a straight "relative response" line intercepting the Y-axis at some distance above the zero origin of the X and Y axes and extending upwardly to the right of the Y-axis.

It will, of course, be recognized by those skilled in the art that the resulting "relative response" lines obtained by the aforementioned plots are simply based on the linear relationship of the spinner speeds to the relative velocities of the fluids passing over the spinner in each of the surveyed intervals. Thus, the measured spinner speed during each run through a given surveyed interval will actually have two directly-additive components — one component being due solely to the velocity of the tool itself and the other component being caused by the soughtafter flow velocity of the well bore fluids in that interval. Accordingly, to eliminate the effects of tool velocity, a so-called "corrected response" line is drawn below and generally parallel to the "relative response" lines and which, theoretically, originates at the zero origin or intersection of the X and Y axes. The fluid velocity at any given point in the well bore is then determined by projecting a horizontal line from the intercept of its associated "relative response" line with the Y-axis (i.e., the average spinner speed at zero tool velocity in that surveyed interval) to an intersection with the "corrected response" line and then projecting a vertical line downwardly from this latter intersection to an intercept of the X-axis (i.e., the "velocity axis") to determine the corresponding fluid velocity at that particular depth. This computed fluid velocity will, of course, theoretically be the velocity of the fluids flowing along the axis of the well bore interval which was being surveyed. This procedure is then repeated for each interval of the well between adjacent perforations; and the computed values are then plotted versus depth to provide a flow profile for the well.

Extensive laboratory experimentation and field operations have shown, however, that the viscosity of the well bore fluids has a marked effect on the rotational speed of the spinner. Thus, the above-described "corrected response" line which, at zero viscosity, originates at the intersection of the X and Y axes does not take into account the possibly-significant effects of viscous drag on the spinner. Accordingly, to better locate this "corrected response" line, the conventional practice heretofore has simply been to arbitrarily shift its origin below the intersection of the X and Y axes by a vertical distance which is assumed to by proportionally related to the actual viscosity of the well bore fluids. This distance is, of course, an empirical correction which merely corresponds to the estimated or observed reduction in the rotational speed of the spinner due to the viscous drag of a fluid of a given viscosity. This empirical correction is, however, potentially misleading since the true viscosity of the well bore fluids is rarely known at the time a flowmeter test is being made. Those skilled in the art will appreciate, moreover, that this prior-art technique will not be fully reliable in every situation such as those where the fluid viscosity changes in different intervals of a given well bore.

As fully described in a copending application, U.S. Pat. No. 3,905,226, an alternative calibration technique has been recently proposed in which the actual operational response of a spinner-type flowmeter can be determined more accurately. In employing this new and improved technique, a spinner-type flowmeter is successively passed in opposite directions through a well bore containing flowing fluids for obtaining two or three measurements representative of the rotational speeds of the spinner while it is turning in one rotational direction and at different tool travel speeds as well as two or three measurements representative of the rotational speed of the spinner while it is rotating in the opposite direction and at different tool travel speeds. The measurements taken at selected depth intervals between each set of perforations are then correlated to provide performance data indicative of the corresponding rotational speeds of the flowmeter spinner in both of its rotational directions at different relative fluid velocities for determining the upper and lower limits of the range of relative fluid velocities which are ineffective for inducing rotation of the spinner in each rotational direction in each of the unperforated intervals of the well being surveyed. The velocity of each of these fluids is then determined by establishing the mid-point of the aforementioned relative velocity range in each surveyed interval of the well bore. Where the fluids in the well bore are about the same viscosity, the correlated data may also be used to compute the several flow rates then from the measurements obtained with that flowmeter at different depth intervals throughout the well bore.

Although the calibration technique described in the aforementioned application provides more-accurate flow determinations than have been possible heretofore, it has been found that there are some situations in which that new and improved technique cannot be reliably employed for preparing flow profiles. For example, in practicing the inventive technique described in that copending application, it is necessary to make a minimum of three traversals of the well bore being tested; and, in most instances, superior results require that the flowmeter be passed two or three times in each direction through the several well bore intervals of interest. As a result, where a given well is fairly deep, considerable time will be required to make the numerous measurements called for in practicing that technique. Thus, should the well bore conditions change significantly during the course of a flow measurement test using that new and improved technique, it is often necessary to make additional traversals of the well bore to secure a more-accurate evaluation of the flow conditions. Similarly, where the well bore conditions are continually varying throughout the test, the resulting measurements will be correspondingly affected. In either situation, it is difficult to properly evaluate the measurements for determining an accurate flow profile of the well bore. It should also be noted that the time required for obtaining these numerous measurements will often be excessive.

Regardless of which of the aforementioned calibration techniques are employed, it will be further appreciated that an accurate flow profile cannot necessarily be prepared from the logs obtained during a flow survey of given well bore since each point on such a flow profile must be determined from the survey measurements at the corresponding depth interval. Thus, the usual practice is to calculate the velocity at a representative number of selected depth intervals in a well bore and prepare a flow profile for the entire well on that basis. As a result, should there be some unexpected change in well bore conditions between two selected depth intervals, the resulting flow profile will not necessarily present the true flow conditions between those two intervals. Similarly, unless the velocity is calculated at a particular depth, the normal statistical variations in the recorded measurements may inadvertently mask an unknown fluid entry or fluid loss of minor magnitude occurring at that particular depth.

Accordingly, it is an object of the present invention to provide new and improved methods for accurately and quickly determining the velocity and flow rate of one or more fluids as they are flowing in a multi-zoned well bore as to provide a continuous and accurate presentation of the flow profile in that well bore.

This and other objects of the present invention are attained by successively lowering and raising a velocity-responsive flowmeter through a well bore having one interval in which the velocity of the fluids is known and at least one other interval in which the fluid velocity is to be determined for obtaining measurements representative of the relative velocities of the well bore fluids across the flowmeter in each of the well bore intervals. Thereafter, the measurements are uniquely correlated by first equating the measurements obtained as the flowmeter was passed back and forth through the interval where the fluid velocity is known and then determining the differential between the measurements respectively obtained as the flowmeter was passed back and forth through the well bore interval or intervals in which the fluid velocity is unknown. Then, by using calibrations representative of the response of the flowmeter to different known fluid velocities, these unknown fluid velocities are accurately determined from the differential measurements. Additionally, by plotting the correlated measurements, a continuous flow profile of the well will be presented.

Figure 4A:
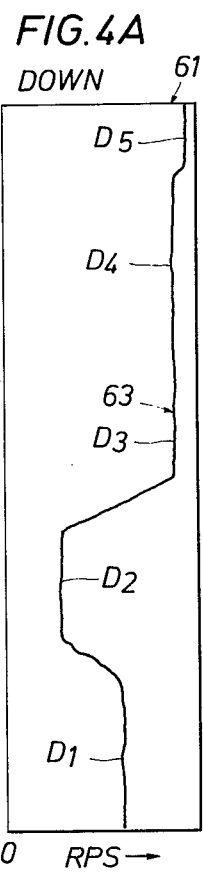
Figure 4B:
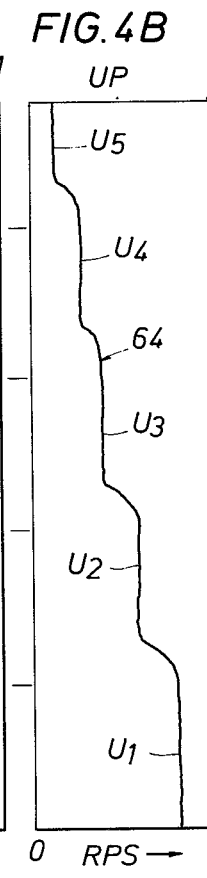
Figure 4C:
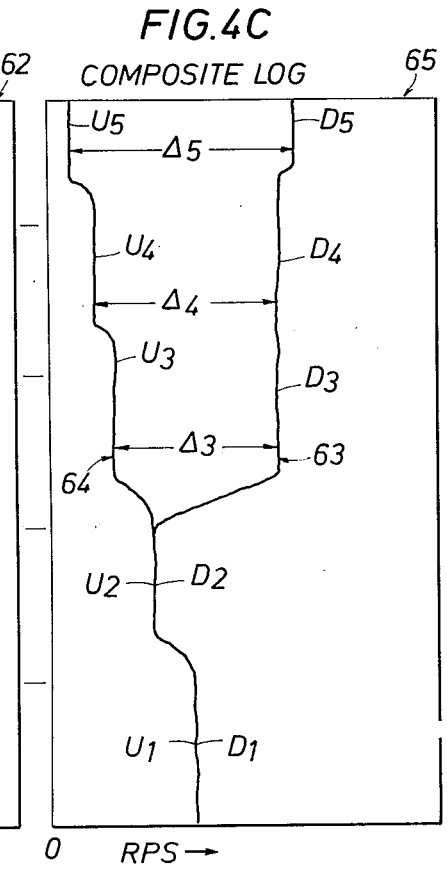

The novel features of the present invention are set forth with particularity in the appended claims. The invention, together with further objects and advantages thereof, may be best understood by way of the following description of exemplary methods employing the principles of the invention as illustrated in the accompanying drawings, in which:

FIG. 1 shows a typical flowmeter as it will appear during the practice of the methods of the present invention in a conventional multi-zoned production well;

FIGS. 2A and 2B respectively depict typical flow-measurement logs representative of what may be obtained during the practice of the present invention in a well bore such as shown in FIG. 1, with these measurements again being presented in FIG. 2C as they might appear when uniquely combined on a composite record for presenting a continuous flow profile of the well bore;

FIG. 3 schematically illustrates another typical multi-zoned production well;

FIGS. 4A-4C respectively show typical measurements similar to those shown in FIGS. 2A-2C and which are made by practicing the methods of the present invention in the well shown in FIG. 3; and FIGS. 5 and 6A-6C, FIGS. 7 and 8-8C and FIGS. 9 and 10-10C are respectively similar to FIGS. 3 and FIGS. 4A-4C but with each set of drawings respectively depicting an alternative measurement procedure which is also in accordance with the principles of the present invention.

Turning now to FIG. 1, a typical velocity-responsive flowmeter 20 (such as the new and improved tool disclosed in U.S. Pat. No. 3,630,078) is depicted as it will appear while suspended from an electrical logging cable 21 in a cased well bore 22. As is customary, the cable 21 is spooled on a winch (not shown) at the surface and cooperatively arranged for moving the tool 20 over a range of selected travel speeds either upwardly or downwardly in the well bore 22. A collar locator 23 is preferably included with the tool 20 and coupled to the cable 21 for providing depth-correlation signals as the tool successively passes collars in the string of casing 24 in the well bore 22. To record the output signals of the flowmeter 20 and the collar locator 23 corresponding to the successive depth positions of the tool in the well bore 22, typical surface indicating-and-recording apparatus, such as a CRT or galvanometer recorder 25, is electrically connected to the cable 21 and adapted to be driven in response to its upward and downward movements by means such as a calibrated cable-engaging measuring wheel 26 that is operatively coupled to the recorder as by a pulse generator or mechanical linkage 27.

As fully described, for example, in U.S. Pat. No. 3,630,078 (which is hereby incorporated by reference herein), the flowmeter 20 includes a multi-bladed propeller or velocity-responsive spinner 28 which is operatively mounted on the lower end of the tool. To maintain the flowmeter 20 in a centered position in the casing 24, typical bow-spring centralizers 29 and 30 are mounted on the tool with the lower one preferably being arranged to also serve as a guard for the spinner 28. As described in the aforementioned patent, the flowmeter 20 is cooperatively arranged for producing an electrical signal which is a substantially-linear function of the rotational speed of the spinner 28. These output signals are transmitted to the surface apparatus 25 by way of the electrical cable 21 where they are successively recorded versus the depth of the flowmeter 20. Although these output signals may, of course, be in any suitable digital or analog form, it will be seen from the aforementioned patent that one convenient arrangement is to produce a series of electrical pulses at a pulse rate which is proportional to the rotational speed of the spinner 28. It should be understood, however, that the new and improved methods of the present invention are equally applicable to any type of flowmeter having an output response that is a substantially-linear function of the relative velocity of fluids across the flowmeter. Thus, a detailed description of the flowmeter 29 is not necessary.

It will, of course, be appreciated that the new and improved methods of the present invention can be successfully employed in either a producing well or an injection well in which monophasic fluids or multiphasic liquids are flowing in either direction. However, for purposes of fully explaining the principles of the present invention, the well bore 22 is depicted in FIG. 1 as being a typical production well that penetrates a number of producing formations 31-33 which have been respectively perforated to allow the various connate fluids such as oil, gas or water contained in each formation to enter the well bore 22, as at 34-36, and flow together to the surface for collection. Those skilled in the art will, of course, recognize that although the several formations 31-33 are illustrated as being fairly close to one another in FIG. 1, these formations may well be separated from one another by several hundreds of feet.

Accordingly, as depicted in FIG. 1, the well bore 22 is divided into four spaced intervals or progressively-higher zones, $Z_1$ through $Z_4$, with the lowermost interval being static and the other intervals respectively having successively-greater flow rates which are to be measured by the flowmeter 20 and determined in accordance with the principles of the present invention. Thus, the lowermost well bore zone $Z_1$ is shown as containing only the connate fluids which have collected in the bottom of the well bore 22 and are in a quiescent or static state. As the fluids 36 produced from the formation 33 flow upwardly from the next interval $Z_2$, they are soon joined by additional connate fluids, as at 35, which are being produced from the next-higher formation 32. Thus, the fluids flowing in the well bore zone $Z_3$ will be a mixture of the flows 35 and 36; and the flow rate in this interval will, of course, be equal to the summation of the respective production flow rates of the formations 32 and 33. In a similar fashion, the overall flow rate in the uppermost zone $Z_4$ will be equal to the summation of the flow rates of the respective production flows 34-36 from all three of the formations 31-33.

As previously discussed, the conventional technique for operating a flowmeter, as at 20, has heretofore been to simply pass the flowmeter at different travel speeds through a well bore against the direction of fluid flow and then use the resulting relative velocity measurements as a basis for correcting the measurements. In the preferred manner of practicing the present invention, however, one series of velocity measurements are obtained while passing the flowmeter, as at 20, at a constant travel speed through the well bore 22 counter to the flow of the fluids, as at 34-36. Moreover, in sharp contrast to the prior art, another series of velocity measurements are also made while moving the flowmeter 20 at a constant travel speed through the well bore 22 in the same direction that the fluids, as at 34-36, are flowing, with this series of measurements being obtained while the tool is moving at a travel speed that is greater than the maximum flow velocity of the well fluids to be certain that the spinner 28 is always rotating in the same direction while these measurements are being obtained. The significance of this latter requirement will be subsequently explained.

As also will subsequently be explained in greater detail, the particular sequence that the aforementioned measurements are obtained is not at all critical to the successful practice of the present invention. However, as a practical matter, it has been found that once the minimum travel speed of the flowmeter 20 is established for those measurements which are to be taken while the tool is moving with the flowing fluids, the most efficient and reliable practice of the present invention is achieved by simply lowering and then raising the flowmeter at selected, constant travel speeds between convenient locations in the well bore 22 respectively located above the uppermost formation 31 and below the lowermost formation 33. It should be realized, of course, that there is no requirement that the travel speed used for raising the tool 20 be the same as that used for lowering the tool; and, if appropriate corrections are made, the travel speed could be changed during a given run. It is also to be understood that the conditions in the well bore 22 should be maintained in a constant state throughout the entire measuring operation to be certain of the accuracy of the relationships between the various measurements obtained during that time. Ordinarily, this poses no major problem since the overall time required to carry out the new and improved methods of the present invention is minimal; and, once the well stabilizes, it can generally be assumed that the conditions in the well bore 22 remain stable for this short period.

Accordingly, if an operating technique such as that briefly described above is followed to obtain the several velocity measurements for practicing the present invention, it will be realized that the logging records provided by the recorder 25 will ordinarily be in the form of an extended series of digital or analog output data representative of the speed of the spinner 28 which is recorded versus the corresponding depth locations of the tool 20 as it is successively lowered and raised in the well bore 22. As is typical, this raw data may be stored by the recorder 25 on a suitable recording medium such as, for example, a magnetic tape or a film. Thus, it is to be understood that it is immaterial to the practice of the present invention as to the manner in which the primary data is stored or recorded so long as it can be retrieved as necessary for deriving the measurements which are to be subsequently described.

However, as an aid to explaining the practice of the present invention, FIGS. 2A and 2B have been prepared to schematically illlustrate typical flowmeter data in the form of visual records or simulated flowmeter logs 37 and 38 that are each aligned with the several well bore zones $Z_1$ through $Z_4$ in FIG. 1 and are respectively depicted again on a single composite log 39 (as shown in FIG. 2C) to uniquely correlate the data obtained during one measuring run. Accordingly, the log 37 in FIG. 2A shows only the continuous measurements 40 of the rotational speed of the spinner 28 as will typically be obtained during a measuring run where the flowmeter 20 is moved downwardly at a selected constant travel speed in the well bore 22 counter to the upwardly-flowing fluids, as at 34–36. Similarly, the log 38 in FIG. 2B depicts the continuous data 41 such as will be obtained during a measuring run where the tool 20 is moved upwardly at a selected constant speed.

Considering the log 37 shown in FIG. 2A first of all, it will be appreciated that as the flowmeter 20 is moved downwardly in the well bore 22 against the upflowing fluids 34–36, the maximum relative velocity between the spinner 28 and the fluids will occur while the tool is in the uppermost well bore interval $Z_4$. Thus, the upper portion $D_4$ of the measurement curve 40 will indicate a correspondingly-high rotational speed for the spinner 28, with this speed dropping, as at 42, to a proportionally-lower speed $D_3$ as the flowmeter 20 is moved below the uppermost formation 31 and encounters a reduced fluid flow. Similarly, as the flowmeter 20 is moved further downwardly in the well bore 22, the rotational speed of the spinner 28 will be correspondingly decreased, as at 43 and 44, as the tool successively passes the formations 32 and 33, and ultimately enters the quiescent lowermost well bore interval $Z_1$. As indicated by the flowmeter log 37, therefore, the measurement curve 40 is divided into four portions $D_1$ through $D_4$ which are respectively located with respect to the velocity axis of the log 37 in proportion to the corresponding relative velocity between the flowmeter 20 and the fluids in each of the several intervals $Z_1$ through $Z_4$ in the well bore 22. Since the flowmeter 20 is moving through the fluids in the well bore 22, it will, of course, be recognized that the measured rotational speed of the spinner 28 represented by the lowermost portion $D_1$ of the measurement curve 40 will be directly related to only the known travel speed of the tool since the lowermost well bore interval $Z_1$ contains only a static column of well bore fluids, as at 45.

The log 38 depicted in FIG. 2B on the other hand represents the response of the flowmeter 20 as it is pulled upwardly in the well bore 22 in the same direction that the production fluids 34-36 are flowing and at a greater travel speed than the velocity of the fluids. Thus, since the flowmeter 20 is carried upwardly at a constant travel speed, the relative velocity between the upflowing fluids 34–36 and the tool will progressively decrease as the tool successively passes through the several well bore zones $Z_1$ through $Z_4$ and successively encounters higher flow rates in each zone. As indicated, therefore, by the log 38, the measurement curve 41 will be divided into four portions $U_1$ through $U_4$ which are respectively located on the log in proportion to the relative fluid velocities in each of the well bore intervals $Z_1$ through $Z_4$.

As previously mentioned, the performance of the spinner 28 is also influenced by the viscosity of the fluids. In other words, for a given relative fluid velocity, the rotational speed of the spinner 28 will be lower when the flowmeter 20 is passing through fluids of a higher viscosity than when it is passing through low-viscosity fluids. Therefore, as previously discussed, prior-art operating techniques with flowmeters, as at 20, have heretofore required either that the resulting measurements of the spinner speed be arbitrarily corrected for an assumed fluid viscosity or, as described in the aforementioned pending application, be obtained by making a sufficient number of upward or downward passes through a well bore, as at 22, for accurately determining the actual effects of viscosity on these measurements. These arbitrary corrections or prolonged operations are, however, not needed in the practice of the present invention.

Accordingly, in practicing the new and improved methods of the present invention, the data from the two measurement curves 40 and 41 is uniquely correlated by first equating the measured responses of the flowmeter 20 as it successively moves upwardly and downwardly through a well bore interval in which the fluid velocity is known. For example, since the lowermost interval $Z_1$ of the well bore 22 illustrated in FIG. 1 is known to contain only the static column of well bore fluids 45, the velocity of these quiescent fluids is zero and the corresponding responses of the flowmeter 20 as it passes through that zone will be solely attributable to the upward and downward travel speeds of the tool. Thus, as schematically depicted in FIG. 2C, the measurement logs 40 and 41 are appropriately correlated or, when a graphical determination is to be made, shifted laterally so as to equate or superimpose the lowermost portions $D_1$ and $U_1$ of the curves 40 and 41 over one another and provide the unique composite log 39. Once this is done, it will be seen that the two measurement curves 40 and 41 on the composite log 39 will progressively separate as illustrated, with this separation becoming greater at those sections of the composite log respectively corresponding to the progressively-higher well bore intervals $Z_2$, $Z_3$ and $Z_4$.

As depicted in FIG. 2C, the lateral separations between those laterally-adjacent portions of the measurement curves 40 and 41 corresponding to the measurements taken in the well bore intervals $Z_2$, $Z_3$ and $Z_4$ are respectively designated by the symbols $\Delta_2$, $\Delta_3$ and $\Delta_4$; and these differentials will each be directly proportional to the respective differences between the velocity or flow rate of the well bore fluids through that particular interval and the zero velocity or flow rate in the static column of fluids 45 contained in the lowermost well bore interval $Z_1$. It should be recognized, therefore, that since the several incremental portions of the two measurement curves 40 and 41 are respectively representative of the response of the flowmeter 20 in the several well bore zones $Z_1$ through $Z_4$ and also there is ordinarily only an insignificant time lag between the downward and upward traversals of the tool through a given zone, the effects of fluid viscosity and other fluid properties on the performance of the spinner 28 in a given zone will be little different if not altogether identical. Thus, as a practical matter, it can be considered that the measured differentials, $\Delta_2$ through $\Delta_4$, between the various rotational speeds of the spinner 28 respectively represented by the corresponding laterally-adjacent portions of the two measurement curves 40 and 41 in a given one of the well bore intervals, $Z_1$ through $Z_4$, are wholly independent of viscosity effects. The significance of this will be subsequently explained.

Accordingly, in keeping with the objects of the present invention, it should be understood that the three derived rotational speed differentials, $\Delta_2$ through $\Delta_4$, graphically depicted on the unique composite log 39 are respectively related solely to the velocity or flow rate of the well bore fluids flowing through each particular interval of the well bore 22. In other words, by using the composite log 39, the viscosity as well as other influential properties of the well bore fluids in each of the several zones $Z_2$, $Z_3$ and $Z_4$ are not a factor in determining the fluid velocities in these intervals from the corresponding speed differentials $\Delta_2$, $\Delta_3$ and $\Delta_4$. Therefore, to convert the several differentials $\Delta_2$ through $\Delta_4$ to fluid velocities in the corresponding zones $Z_2$ through $Z_4$, in the practice of the present invention it is necessary only to know the characteristic response or performance characteristics of the flowmeter 20.

Those skilled in the art will, of course, appreciate that the performance characteristics of a spinner-type flowmeter, as at 20, can be readily determined by measuring the rotational speeds of its spinner, as at 28, at two or more known fluid velocities and then plotting an appropriate calibration curve to graphically depict the performance of the flowmeter over a selected range of velocities and rotational speeds. It should be recognized, however, that calibration curves of this nature are specifically limited to the particular fluid used in determining the flowmeter response. Thus, as previously discussed, such curves are of direct utility only when the viscosity of the fluid being tested is the same as that of the calibration fluid.

It is, of course, well established that calibration curves of this nature are substantially linear except at very-low fluid velocities. In other words, once the fluid velocity across a spinner-type flowmeter, as at 20, exceeds a certain minimum threshold value, the rotational speed of a typical spinner, as at 28 will change linearly as the fluid velocity varies. This is true regardless of the direction of spinner rotation. Moreover, it is of particular significance to recognize that although the absolute calibration values graphically represented by calibration curves of this nature will vary greatly with respect to fluids of different viscosities, experiments have shown that the linear portions of any calibration curve for a given spinner-type flowmeter, as at 20, will always be at, or very nearly, the same slope. In other words, it has been found that regardless of the viscosity of a particular fluid under test, the rotational speed of a spinner, as at 28, will always vary at a constant rate, $R\phi$, for a given change in fluid velocity so long as the fluid velocity is sufficiently high that the spinner is operating in one of the two linear portions of its response curve. This has been found to be true whether the fluid being tested is a single-phase liquid or gas or else a biphasic liquid such as a mixture of water or oil.

Accordingly, it will be understood that in the practice of the new and improved methods of the present invention, the several differential measurements, as at $\Delta_2$ through $\Delta_4$ in FIG. 2C, can be readily converted to accurate velocity or flow rate measurements so long as the performance characteristics of the flowmeter 20 in any fluid is known. As previously mentioned, these performance characteristics can, of course, be readily determined in a typical laboratory procedure such as either by moving the flowmeter 20 at different travel speeds through a standing liquid column or by pumping a fluid at different velocities through a conduit containing the flowmeter.

It will be recalled, however, that it was previously stated that it is of critical importance to the successful practice of the present invention to be assured that the spinner 28 is always rotating in the same direction as the flowmeter 20 is being traversed through the well bore 28 in the same direction that the fluids, as at 34–36, are flowing. The reason for this is to be certain that the flowmeter 20 is operating in the same linear portion of its performance curve as the tool is successively moved through the flowing fluids, as at 34–36. Accordingly, in the preferred manner of practicing the present invention, the previously-mentioned calibration runs for determining the minimum travel speed of the flowmeter 20 are conducted in the highest interval $Z_4$ of the well bore 22 to be certain that as the tool is subsequently moved from zone $Z_1$ to zone $Z_4$ the spinner 28 will continue rotating in the same direction and will still be at a sufficiently-high rotational speed for remaining in the linear portion of the flowmeter performance curve.

Thus, it is ordinarily convenient to simply move the tool 20 upwardly at two or three different travel speeds through a short portion of the uppermost well bore interval $Z_4$. These trial runs will enable an experienced operator to easily determine a convenient travel speed as required for assuring that the spinner 28 will continue to rotate in the same direction as the flowmeter 20 is subsequently moved along with the flowing well bore fluids 34–36. At the same time, since these trial runs are being conducted in the same well bore interval $Z_4$, it may be safely assumed that the fluid flow rate in the zone remains constant during this short interval of time; and, therefore, the change between the two known travel speeds will produce a measurable change in the rotational speed of the spinner 28 from which the aforementioned rate of change $R\phi$, of the spinner speed can be readily determined.

Accordingly, regardless of how the rate of change, $R\phi$, of the spinner speed is actually determined, this constant conversion factor can be easily employed for converting the several differentials, $\Delta_2$ through $\Delta_4$, into direct measurements of the corresponding average fluid velocities, $V_2$ through $V_4$, in the respective well bore intervals $Z_2$ through $Z_4$ by means of the following equations:

$$V_2 = \frac{0.84 \Delta_2}{2R\phi} \quad \text{(Eq. 1)}$$

$$V_3 = \frac{0.84 \Delta_3}{2R\phi} \quad \text{(Eq. 2)}$$

$$V_4 = \frac{0.84 \Delta_4}{2R\phi} \quad \text{(Eq. 3)}$$

The 0.84 factor in the above equations will, of course, be recognized as being a standard correction factor used to correct for the velocity profile in turbulent flow conditions. It should also go without saying that once the average velocity in a given well bore interval is determined, the corresponding flow rate can be calculated where the cross-sectional area of that interval of the well bore 22 is known.

As previously mentioned, the response to a spinner-type flowmeter, as at 20, is directly influenced by the viscosity and other properties of the fluids in which it is moving. This influence is, of course, a significant cause of the lack of accuracy in the prior-art measuring techniques described above. However, in the practice of the new and improved methods of the present invention, this inherent effect of viscosity on the response of a spinner-type flowmeter, as at 20, is turned to advantage since these new and improved techniques are able to eliminate the effects of viscosity and other fluid properties on the velocity measurements in any given well bore interval.

accordingly, to demonstrate this further aspect of the invention, FIGS. 3 and 4A-4C are presented to schematically represent the practice of the present invention in a well bore 50 which penetrates several formations 51-54, with the latter one of these formations unknowingly being non-productive. Those skilled in the art will recognize, of course, that this is a common situation in which a flowmeter survey will be used. As seen, therefore, in FIG. 4, the well bore 50 penetrates several formations and the three higher formations 51-53 are illustrated as producing, as at 55-57, and the lowermost formation 54 is shown as not producing. As is common, the lower portion of the well bore is blocked, as at 58, with a bridge plug or cement plug and there is a static column of water 59 and oil 60 standing above the plug. The segregated oil column 60 will, of course, be above the segregated column of water 59 by virtue of the differences in their respective densities.

In this representative situation, it will be recognized that the measurements obtained by lowering and raising a spinner-type flowmeter, as at 20, will produce two logs as respectively depicted at 61 and 62 in FIGS. 4A and 4B. Viewing FIG. 4A first of all, it will be seen that the measurement curve 63 on the log 61 has a lower portion, $D_1$, which is followed by an intermediate portion, $D_2$, that is laterally shifted to the left of the axis of the lower portion. Thereafter, the next two portions, $D_3$ and $D_4$, of the measurement curve 63 are substantially aligned with one another and respectively shifted somewhat to the right of the axis of the lower curve portion $D_1$. As would be expected, the curve portion $D_5$ is shifted somewhat further to the right. Those skilled in the art will, of course, appreciate the anomalous appearance of the two portions $D_3$ and $D_4$ of the measurement curve 63 particularly when the log 61 is compared with the log 62.

On the other hand, it will be recognized that the log 62 appears to be a typical flowmeter log inasmuch as each of the several portions $U_1$ through $U_5$ of the measurement curve 64 are respectively shifted to the left as each of the several intervals, $Z_1$ through $Z_5$, in the well bore 50 are traversed. Using conventional interpretative techniques, taken alone, the log 62 would ordinarily be considered as possibly showing production fluids entering each of the several well intervals $Z_2$ through $Z_5$.

However, in keeping with the principles of the present invention, a wholly-different picture is presented when the data is uniquely correlated as by the composite log 65 depicted in FIG. 4C. To produce the unique composite log 65, the two measurement curves 63 and 64 are correlated or, when a graphical solution is made, shifted laterally to superimpose the lowermost curve portions $D_1$ and $U_1$, since it is known at the outset of the testing procedure that the lower interval $Z_1$ of the well bore 50 contains a quiescent, static column of liquid, as at 59. As illustrated in FIG. 4C, however, it will be found that superimposition of the lowermost curve portions, $D_1$ and $U_1$, will also result in the unexpected superimposition of the next-higher curve portions $D_2$ and $U_2$. In view of the preceding discussion about FIGS. 2A-2C, it will be recognized, therefore, that the resulting superimposition of the curves 63 and 64 clearly signifies there is no detectable fluid flow from the formation 54. Instead, it has been found during the practice of the present invention that a lateral shift between adjacent superimposed portions of the correlated measurement curves, as at 63 and 64, is representative of a difference between viscosity, and possibly other properties, of the respective fluids in the corresponding well bore intervals. These tests have further shown that a leftward shift of one superimposed portion with relation to another is indicative of an increase in viscosity and that a rightward shift is indicative of a decrease in viscosity. Accordingly, it can be safely assumed that the shift between the lowest and next-highest superimposed curve portions on the unique composite log 65 is conclusively representative of the presence of the segregated columns of water 59 and oil 60 since the superimposition of the curve portions $D_2$ and $U_2$ clearly shows there is no fluid entering the well bore 50 from the lower formation 54.

When the composite log 65 is further considered, it will be noted that the rapid divergence of the two correlated measurement curves 63 and 64 above their superimposed portions $D_2$ and $U_2$ is clear evidence of the entrance of the fluids, as at 57, into the well bore 50 from the formation 53. Hereagain, as was previously discussed with respect to the unique composite log 39 in FIG. 2C, it will be recognized that the differential $\Delta_3$ between the two associated portions $D_3$ and $U_3$ of the correlated measurement curves 63 and 64 will be directly related to the fluid velocity and flow rate in the interval $Z_3$ of the well bore 50 and the same calibration technique can be applied for providing a solution using Equation 3, for example. Similarly, it will be noted from FIG. 4C that the progressively-larger differentials $\Delta_4$ and $\Delta_5$, on the unique composite log 65 respectively indicate the entry of the fluids 56 and 55 into the well bore 50 along with a corresponding increase in the overall flow rates in the well bore intervals $Z_4$ and $Z_5$. The calculation of these respective flow rates will, of course, be in keeping with the computational procedure explained above.

Particular attention should also be given to the relative differences in the vertical positions of the curve portions $D_3$, $D_4$ and $D_5$ on the one hand and of the curve portions $U_3$, $U_4$ and $U_5$ on the other hand. These respective differences in vertical positioning have particular significance in the practice of the present invention since these new and improved methods eliminate the effects of viscosity and other fluid properties on the relative positions of laterally-adjacent portions of the measurement curves 63 and 64 and, as a result, correspondingly highlight variations in viscosity and other fluid properties between different portions of each measurement curve. For example, as schematically represented in FIG. 4C, the unique composite log 65 clearly shows also that there is a difference between the fluid viscosity of the several fluids 55–57 entering the well bore 50.

By way of an introductory explanation, it has been found that the measurement curve, as at 63, corresponding to downward travel of a flowmeter, as at 20, will shift to the left in high-viscosity fluids and shift to the right in low-viscosity fluids. Similarly, the measurement curve, as at 64, corresponding to upward travel of a spinner-type flowmeter, as at 20, will operate in the same manner, with the curve again shifting to the left in high-viscosity fluids and to the right in low-viscosity fluids. Accordingly, when these findings are considered with respect to the unique composite log 65 shown in FIG. 4C, it will be noted first of all that although there are increasing flow rates between the successively-higher well bore intervals $Z_3$ and $Z_4$ and that these increases should, in turn, produce progressively-lower rotational speeds of a flowmeter spinner, as at 28, as a flowmeter, as at 20, is lowered through these intervals in the well bore 50, the curve portions $D_3$ and $D_4$ are instead substantially in alignment with one another rather than being progressively shifted to the left. Thus, in view of the previously-noted effect of changing viscosities on the downward response curve, it can be reliably determined that the viscosity of the fluids 57 in the well bore interval $Z_3$ is lower than the viscosity of the combined fluids 56 and 57 in the interval $Z_4$ so that this lower viscosity has caused the curve portion $D_3$ to shift to the right by an amount which appears to be about equal to the inherent drop in spinner speed as the flowmeter, as at 20, is lowered from the interval $Z_4$ into the interval $Z_3$ and encounters a lower flow rate.

The opposite reaction is seen as occurring in the measurement curve 64 which is obtained as the flowmeter, as at 20, is raised in the well bore 50. Ordinarily, the upward travel of a spinner- type flowmeter in the well bore 50 would be expected to cause a successive number of decreases in spinner speed and which would be represented by a corresponding shift to the left of the related portions of the measurement curve 64 thereby indicating a lower relative fluid velocity across the tool by the ever-increasing flow of fluids at successively-higher well bore intervals. This is, of course, depicted in FIG. 2B, for example. However, in view of the significant influence of differing viscosities upon the measurement curve 64, FIGS. 4B and 4C show a typical condition where the lower-viscosity fluids in the zone $Z_3$ of the well bore 50 have instead shifted the curve portion $U_3$ somewhat to the right and the higher-viscosity fluids in the well bore zone $Z_2$ have instead caused the curve portion $U_2$ to shift somewhat to the left. Thus, the relative difference in vertical alignment of the curve portions $U_2$ and $U_3$ is not as great as would otherwise be expected if there had been little or no change in viscosity. It must be recognized, however, that these relative differences in vertical alignment between the several curve portions $U_1$ through $U_5$ and $D_1$ through $D_5$ do not affect the accuracy of the velocity or flow rate measurements which are derived from the several differentials $\Delta_1$ through $\Delta_5$.

Figure 5:
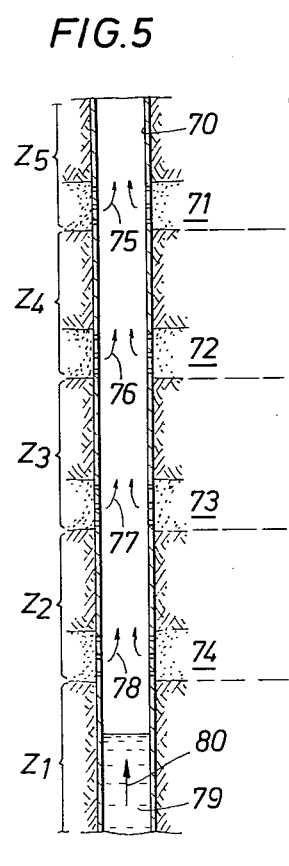

It will, of course, be recognized that there are many situations in which a flowmeter, as at 20, cannot be traversed through a static column of well bore fluids for determining the corresponding response of the tool. For example, as schematically illustrated in FIG. 5, a well bore 70 is shown as penetrating several formations 71–74 which are respectively producing connate fluids, as at 75–78. However, in this exemplary situation, the lower portion of the well bore 70 has been filled with debris or sand, as at 79, so that the lowermost interval $Z_1$ in the well bore is of insufficient depth to accommodate a spinner-type flowmeter, as at 20, for making measurements. Thus, if the lower zone $Z_1$ of the well bore 70 shown in FIG. 5 was quiescent or static, the sand column 79 would prevent the obtaining of reference measurements in a static fluid column as previously discussed with respect to the preceding figures. A similar problem could also occur where there was a production of fluids, as at 80, from some unillustrated well bore interval covered by the column of sand 79. At any rate, it will be appreciated that there are situations where there is either no quiescent or static zone in a well bore or there is some obstruction in the well bore which prevents a flowmeter, as at 20, from getting into a static fluid column.

Accordingly, in keeping with the principles of the present invention, when a situation arises where a spinner-type flowmeter, as at 20, cannot be traversed through a static fluid column, the new and improved methods of the invention are carried out by simply lowering and raising the flowmeter through the well bore, as at 70, and obtaining measurements along all of the several zones, as at $Z_1$-$Z_5$ . It will, of course, still be necessary to initially move the flowmeter, as at 20, upwardly in the uppermost interval $Z_5$ for determining the minimum upward travel speed of the tool as previously discussed.

Figure 6A:
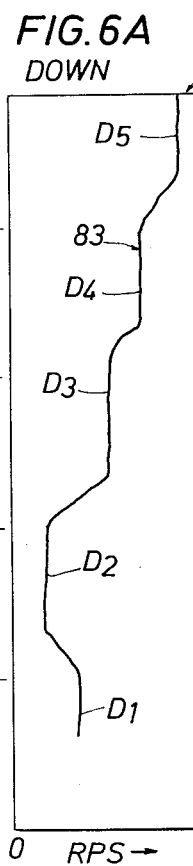
Figure 6B:
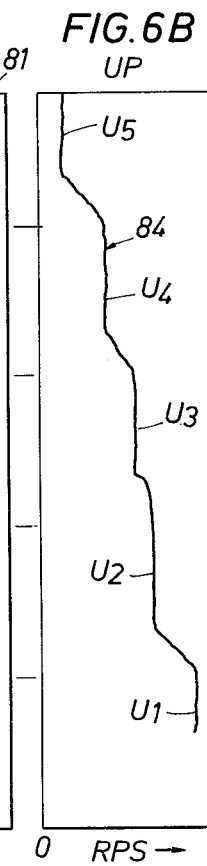
Figure 6C:
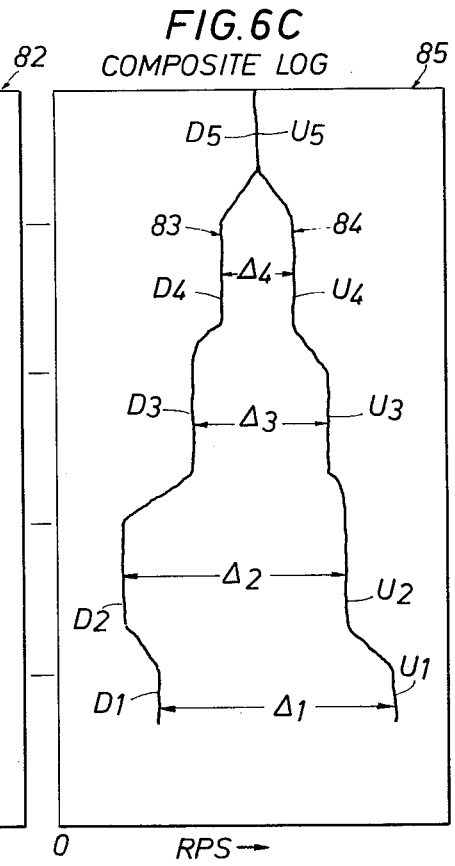

The successive downward and upward traversals of the flowmeter, as at 20, through the well bore 70 will, therefore, produce measurement logs 81 and 82 as respectively depicted in FIGS. 6A and 6B. The general similarity between the logs 81 and 82 are those shown, for example, at 37 and 38 in FIGS. 2A and 2B make it unnecessary to describe the measurement curves 83 and 84 shown on the first-mentioned logs. Turning now to FIG. 6C, it will be seen that in this illustrated alternative technique for practicing the present invention, the measurement curves 83 and 84 have been uniquely correlated so that, with the depicted graphical solution, the uppermost curve portions $D_5$ and $U_5$ of these curves have instead been superimposed over one another. As a result, the composite log 85 will instead show a progressively-greater divergence between the lower portions of the measurement curves 83 and 84. Thus, it will be seen from the composite log 85 that the greatest differential $\Delta_1$ will be between the lowermost portions $D_1$ and $U_1$ of the measurement curves 83 and 84 respectively; and since it is seen that there is production from all of the formations 71–74, the differentials $\Delta_2$ through $\Delta_4$ will be progressively smaller.

It should be recognized, therefore, that the unique composite log 85 will, as a minimum, provide information which will graphically portray the relative contributions of each of the several fluids 75–78 and 80, with the total flow in the highest zone $Z_5$ being equal to 100 percent. It will be further understood, of course, that the effects of viscosity between laterally-adjacent portions of the correlated measurement curves 83 and 84 on the unique composite log 85 will be cancelled for the same reasons as previously discussed. Similarly, the same effects as described above will be operative for causing various portions of a given measurement curve to shift laterally in accordance with various changes in viscosity between different zones of the well bore 70.

Accordingly, it will be seen from the composite log 85 that the several separations $\Delta_1$ through $\Delta_4$ will be related to the relative proportions of the overall flow through the uppermost interval $Z_5$ of the well bore 70 which is respectively contributed to by each of the formations 71–74 as well as by the fluids 80 coming from the lowermost zone $Z_1$. Thus, the following equations may be used:

$$V_1 = V_s - \frac{0.84\Delta_1}{2R\phi} \qquad \text{(Eq. 4)}$$

$$V_2 = V_s - \frac{0.84\Delta_2}{2R\phi} \qquad \text{(Eq. 5)}$$

$$V_3 = V_s - \frac{0.84\Delta_3}{2R\phi} \qquad \text{(Eq. 6)}$$

$$V_4 = V_s - \frac{0.84\Delta_4}{2R\phi} \qquad \text{(Eq. 7)}$$

It will, of course, be recognized that the overall velocity $V_5$ can be readily determined knowing the casing diameter of the well bore 70 and the overall production flow rate of the well.

As previously mentioned, the methods of the present invention are, of course, equally applicable for production wells and injection wells. Thus, where an injection well is being surveyed to determine the flow of the injection fluid (e.g., water) into each of several formation intervals, the same rationale as described above in each of the several assumed situations will still apply. However, since the flow in an injection well is downward, it will be appreciated that downward movement of the flowmeter, such as at 20, will be with the flowing fluids and upward movement of the flowmeter will be counter to the direction of flow. Accordingly, in this situation, a unique composite log such as those respectively shown in FIGS. 2C, 4C or 6C will still be provided; but the measurements obtained as the tool 20 is moving upwardly will instead be similar to the logs 37, 61 and 81 and the measurements taken when the flowmeter is moved downwardly will instead be similar to the logs 38, 62 and 82. Otherwise, all other procedures as explained by reference to the several drawings will be followed to practice the new and improved methods of the present invention.

To illustrate a further unique aspect of the present invention, FIG. 7 depicts a typical well bore 90 which penetrates various perforated earth formations, as at 91–94. In contrast to the well bores previously described with respect to the several preceding drawings, the well bore 90 is shown as producing fluids, as at 95–97, only from the two higher formations 91 and 92 and the upper portion of the next-lower formation 93. In this illustrated situation, although fluids, as at 98, are also being produced from the lower portion of the formation 93, these fluids are unknowingly flowing downwardly in the well bore 90 and entering the lowermost formation 94 as at 99. Those skilled in the art will, of course, appreciate that so-called "cross-flows," as at 98 and 99, are not at all uncommon and, once discovered, must be corrected as by plugging the well bore 90 between the two lower formations 93 and 94.

Accordingly, to illustrate the utility of the new and improved methods of the present invention in detecting the presence of such unwanted cross-flow situations, FIGS. 8A and 8B are presented to respectively depict typical flow-survey logs 100 and 101 which would ordinarily be obtained by successively lowering and raising a flowmeter, as at 20, at selected cable speeds through the several intervals, $Z_1$ through $Z_5$, of the well bore 90. Inasmuch as the logs 100 and 101 are generally similar to those respectively shown at 37 and 38 in FIGS. 2A and 2B, it is, of course, unnecessary to discuss in detail the several portions of the two measurement curves 102 and 103. It should be noted in passing, however, that in the illustrated situation, it is known that the lowermost interval, $Z_1$, of the well bore 90 contains a static column of fluids, as at 104, so that the lower portions $D_1$ and $U_1$ of the two measurement curves 102 and 103, respectively, will be directly related to only the known travel speeds of the flowmeter, as at 20, in this static fluid column.

Thus, in keeping with the previously-discussed principles of the present invention, a composite log, as at 105 in FIG. 8C, can be readily prepared by correlating the two measurement curves 102 and 103 so as to superimpose their respective lowermost portions $D_1$ and $U_1$ on this unique composite log. However, in sharp contrast to the previously-described composite logs 39, 65 and 85, it will be seen from FIG. 8C that the composite log 105 will instead have the measurement curves 102 and 103 crossing one another at an intersection 106 lying between their respective portions $D_2$ and $D_3$ and $U_2$ and $U_3$.

By way of explanation, it will be recalled from the previous discussion that as a flowmeter, as at 20, is moved upwardly along with upwardly-flowing fluids, as at 95–97, its spinner, as at 28, will correspondingly slow as the flowmeter encounters higher flow rates. Thus, when the upwardly-moving flowmeter, as at 20, unexpectedly meets the downwardly-moving fluids 98 and 99 in the well bore 90, there will be a corresponding increase in the relative fluid velocity across the flowmeter and, therefore, a corresponding increase in the rotational speed of the flowmeter spinner, as at 28, as the flowmeter passes through these downwardly-moving fluids. The speed will, of course, drop once the flowmeter, as at 20, is moved beyond the downwardly-moving fluids as at 98 and 99. These changes are, therefore, respectively represented by the changes in direction 107 and 108 at the opposite ends of the intermediate portion $U_2$ of the measurement curve 103. Conversely, the intermediate portion $D_2$ of the other measurement curve 102 will also have a reverse trend that is temporarily caused by the proportional decrease in spinner speed occasioned by the downward passage of the flowmeter, as at 20, through the downwardly-moving fluids 98 and 99.

Accordingly, as illustrated by the unique composite log 105, the resulting differential $\Delta_2$ between the laterally-adjacent portions $D_2$ and $U_2$ of the correlated measurement curves 102 and 103 will be representative of the flow rate of the downwardly-moving fluids 98 and 99 and the reversed positions of these adjacent portions of the curves below their intersection point 106 will be clearly indicative of the presence of the cross-flowing fluids, as at 98 and 99, leaving the formation 93 and unknowingly entering the lowermost formation 94. The remainder of the correlated measurement curves 102 and 103 on the unique composite log 105 is, of course, interpreted in the same manner as previously discussed, with the several differentials $\Delta_3$, $\Delta_4$ and $\Delta_5$ being respectively representative of the fluid velocities occurring in each of the higher intervals $Z_3$, $Z_4$ and $Z_5$ in the well bore 90.

As previously mentioned, the prior-art techniques employed heretofore for preparing flow profiles of a given well bore have been subject to possibly overlooking the entry or loss of a minor quantity of fluids where the change in flow rate in a given well bore interval is so negligible that the survey measurements will not clearly show such a change. Accordingly, to illustrate another advantage provided by the practice of the new and improved methods of the present invention, FIG. 9 is presented to depict a typical well bore 110 which penetrates two different earth formations 111 and 112, with the lower formation producing only a minor flow, as at 113, of oil and the upper formation producing a substantial flow, as at 114, of oil accompanied by intermittent surges or bubbles of gas. Hereagain, in this illustrated example, it is assumed that the lowermost interval $Z_1$ of the well bore 110 is filled with a static column of fluids, as at 115, of sufficient depth to allow a flowmeter, as at 20, to be passed back and forth to obtain measurements representative of only the movement of the flowmeter at known downward and upward travel speeds.

Thus, as respectively illustrated by the logs 116 and 117 shown in FIGS. 10A and 10B, the successive lowering and raising of a spinner-type flowmeter, as at 20, in the well bore 110 will provide corresponding measurement curves 118 and 119 which, in this exemplary situation, will be analogous to those previously discussed with respect to FIGS. 2A and 2B and, therefore, require no detailed explanation. Hereagain, the unique composite log 120 depicted in FIG. 10C is readily obtained by correlating the two measurement curves 118 and 119 so that their respective lower portions $D_1$ and $U_1$ will be superimposed. As shown by the close proximity of the adjacent portions $D_2$ and $U_2$ of the correlated measurement curves 118 and 119 on the composite log 120, it will be clear that the correspondingly-small differential $\Delta_2$ presented on the log clearly represents that the velocity and flow rate of the fluids 113 is very minor in comparison to the overall velocity and flow rate of the fluids 114. Those skilled in the art will, of course, recognize that the normal dynamic variations in each of the intermediate portions $D_2$ and $U_2$ of the two measurement curves 118 and 119 could well be of sufficient lateral magnitude that even an experienced operator might easily assume that those curves independently show there are no flowing fluids in the intermediate interval $Z_2$ of the well bore 110. Thus, unless the unique composite log 120 is prepared in accordance with the principles of the present invention, the minor fluid entry at 113 in the well bore 110 might well be overlooked.

As a still-further aspect of the present invention, it will be noted in FIGS. 10A-10C that the upper portions $D_3$ and $U_3$ of the two measurement curves 118 and 119 respectively depict significant lateral variations as at 121 and 122. Those skilled in the art will, of course, appreciate that variations of this nature are, for example, common indications of the presence of intermittent bubbles of gas accompanying a flow of oil. It will be further appreciated, however, that with prior-art techniques for preparing flow profiles of a given well bore, as at 110, significant variations, as at 121 and 122, in the measurement curves, as at 118 and 119, make it difficult to select a representative point from which the average velocity in that interval $Z_3$ of the well bore is to be computed using prior-art techniques.

The practice of the new and improved methods of the present invention make it quite easy, however, to correctly determine the average velocity in a well bore, as at 110, where there is a flow of a biphasic fluid, as at 114. Thus, as depicted by the unique composite log 120 in FIG. 10C, the new and improved correlation techniques of the present invention make it quite easy to simply determine one or, if desired, more differentials, as at $\Delta_3$, at various depth levels throughout the zone $Z_3$ so as to better establish an overall average of the actual flow rate through that zone. It will be further appreciated that when a graphical solution such as the composite log 120 is employed, a straightforward approach would be to visually estimate a mean average for each portion $D_3$ and $U_3$ of the measurement curves 118 and 119 and then determine the differential $\Delta_3$ between these two mean averages.

Accordingly, it will be appreciated that the new and improved methods of the present invention are uniquely adapted for accurately determining the flow rates of well bore fluids with velocity-responsive flowmeters. Thus, by successively lowering and raising a flowmeter (such as the spinner-type tool shown in U.S. Pat. No. 3,630,078) through the fluids flowing in a well bore, the speed of rotation of the spinner can be measured in each well bore interval for each traversal of the tool. Thereafter, these measurements are uniquely correlated by first equating the measurements obtained through a well bore interval having a known fluid velocity. The relative differences in the performance of the flowmeter in each of the other well bore intervals during each traversal of the flowmeter are then determined for readily deriving the fluid velocities in each zone. Once these velocities are determined, the actual fluid flow rate in each well bore zone can, of course, be calculated with accuracy.

While only a few particular modes of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for determining the velocity of a fluid flowing in a selected interval of a well bore with a flowmeter having sensing means adapted to provide output measurements proportional to the relative velocity of fluids flowing across said flowmeter and comprising the steps of:

passing said flowmeter at a selected travel speed between said selected well bore interval and another interval of said well bore containing a fluid having a known velocity and in a direction of travel counter to said flowing fluid for obtaining one set of output measurements representative of the relative velocities between said flowmeter and said fluids in said selected well bore interval and in said other well bore interval respectively acting in one relative direction;

passing said flowmeter in the opposite direction of travel between said selected well bore interval and said other well bore interval and only at a selected travel speed which is greater than the velocity of said flowing fluid for obtaining another set of output measurements representative of the relative velocities between said flowmeter and said fluids in said selected well bore interval and in said other well bore interval respectively acting in the other relative direction;

equating at least some of said output measurements in each of said sets respectively obtained in said other well bore interval for correlating those of said output measurements in each of said sets respectively obtained in said selected well bore interval; and determining the differential between at least one output measurement from said one set obtained at a selected depth location within said selected well bore interval and at least one output measurement from said other set obtained at said selected depth location for deriving a function representative of the axial velocity of said flowing fluid in said selected well bore interval.

2. The method of claim 1 further including the step of:

multiplying said function of said axial velocity by a factor of about 0.84 times the cross-sectional area of said selected well bore interval at said selected depth location for determining a function of the actual flow rate of said flowing fluid therein.

3. The method of claim 1 wherein said selected travel speeds are respectively constant but unequal with respect to one another.

4. The method of claim 1 wherein said known fluid velocity in said other well bore interval is zero.

5. The method of claim 1 wherein said known fluid velocity in said other well bore interval is not zero.

6. The method of claim 1 further including the steps of:

obtaining a set of calibration measurements representative of the rate of change in said output measurements of said sensing means for a known change in relative fluid velocity across said flowmeter; and dividing said function of said axial velocity by a factor of twice said rate of change for determining the true axial velocity of said blowing fluid in said selected well bore interval.

7. The method of claim 6 including the step of:

multiplying said function of the true axial velocity by a factor of about 0.84 times the cross-sectional area of said selected well bore interval at said selected depth location for determining a function of the actual flow rate of said flowing fluid therein.

8. A method for determining the velocity of a fluid flowing in a selected well bore interval with a flowmeter having a rotatable spinner adapted to turn in a rotational direction and at a proportionally-related rotational speed respectively representative of both the relative direction and the relative velocity of said flowing fluid with respect to said flowmeter for producing measurements indicative of said spinner speed and comprising the steps of:

passing said flowmeter at a selected travel speed between said selected well bore interval and a lower well bore interval containing a static column of well bore fluids and in a travel direction counter to said flowing fluid for obtaining one set of successive measurements respectively representative of the corresponding rotational speeds of said spinner in one of its said rotational directions in said selected well bore interval and in said lower well bore interval;

passing said flowmeter in the opposite travel direction between said selected well bore interval and said lower well bore interval and at a selected travel speed which is always greater than the velocity of said flowing fluid for obtaining another set of successive measurements respectively representative of the corresponding rotational speeds of said spinner in the other of its said rotational directions in said selected well bore interval and in said lower well bore interval;

equating at least a representative number of said successive measurements in each of said sets respectively obtained in said lower well bore interval for correlating those of said successive measurements in each of said sets respectively obtained in said selected well bore interval; and determining the differential between at least one of said successive measurements in each of said sets respectively obtained at at least one selected depth location in said selected well bore interval for deriving a function representative of the axial velocity of said flowing fluid at said selected depth location in said selected well bore interval.

9. The method of claim 8 wherein said selected travel speeds are respectively constant but unequal with respect to one another.

10. The method of claim 8 further including the step of:

multiplying said function of said axial velocity by a factor of about 0.84 times the cross-sectional area of said selected well bore interval at said selected depth location for determining a function of the actual flow rate of said flowing fluid therein.

11. The method of claim 8 wherein said equating step is performed by plotting said successive measurements versus depth with those of said successive measurements respectively obtained in said lower well bore interval being superimposed for positioning those of said successive measurements respectively obtained in said selected well bore interval at laterally-spaced locations which are separated in proportion to the axial velocities of said flowing fluid at corresponding depth locations in said selected well bore interval.

12. The method of claim 8 further including the steps of:
  obtaining a set of calibration measurements representative of the proportional rate of change in rotational speed of said spinner in at least one of its said rotational directions for a known change in relative fluid velocity across said spinner; and
  dividing said function of said axial velocity by a factor of twice said rate of change for determining the true axial velocity of said flowing fluid at said selected depth location in said selected well bore interval.

13. The method of claim 12 further including the step of:
  multiplying said true axial velocity by a factor of about 0.84 times the cross-sectional area of said selected well bore interval at said selected depth location for determining the actual flow rate of said flowing fluid therein.

14. The method of claim 13 wherein said selected travel speeds are respectively constant but unequal with respect to one another.

15. A method for determining the velocity of a fluid flowing in a selected well bore interval with a flowmeter having a rotatable spinner adapted to turn in a rotational direction and at a proportionally-related rotational speed respectively representative of both the relative direction and the relative velocity of said flowing fluid with respect to said flowmeter for producing measurements indicative of said spinner speed and comprising the steps of:
  passing said flowmeter at a selected travel speed between said selected well bore interval and a higher well bore interval containing fluids flowing at a known velocity and in a travel direction counter to said flowing fluid for obtaining one set of successive measurements respectively representative of the corresponding rotational speeds of said spinner in one of its said rotational directions in said selected well bore interval and in said higher well bore interval;
  passing said flowmeter in the opposite travel direction between said selected well bore interval and said higher well bore interval and at a selected travel speed which is always greater than the velocity of any of said flowing fluids for obtaining another set of successive measurements respectively representative of the corresponding rotational speeds of said spinner in the other of its said rotational directions in said selected well bore interval and in said higher well bore interval;
  equating at least a representative number of said successive measurements in each of said sets respectively obtained in said higher well bore interval for correlating those of said successive measurements in each of said sets respectively obtained in said selected well bore interval; and
  determining the differential between at least one of said successive measurements in each of said sets respectively obtained at at least one selected depth location in said selected well bore interval for deriving a function representative of the axial velocity of said flowing fluid at said selected depth location in said selected well bore interval.

16. The method of claim 15 wherein said selected travel speeds are respectively constant but unequal with respect to one another.

17. The method of claim 15 further including the step of:
  multiplying said function of said axial velocity by a factor of about 0.84 times the cross-sectional area of said selected well bore interval at said selected depth location for determining a function of the actual flow rate of said flowing fluid therein.

18. The method of claim 15 wherein said equating step is performed by plotting said successive measurements versus depth with those of said successive measurements respectively obtained in said higher well bore interval being superimposed for positioning those of said successive measurements respectively obtained in said selected well bore interval at laterally-spaced locations which are separated in proportion to the axial velocities of said flowing fluid at corresponding depth locations in said selected well bore interval.

19. The method of claim 15 further including the steps of:
  obtaining a set of calibration measurements representative of the proportional rate of change in rotational speed of said spinner in at least one of its said rotational directions for a known change in relative fluid velocity across said spinner; and
  dividing said function of said axial velocity by a factor of twice said rate of change for determining the true axial velocity of said flowing fluid at said selected depth location in said selected well bore interval.

20. The method of claim 19 further including the step of:
  multiplying said true axial velocity by a factor of about 0.84 times the cross-sectional area of said selected well bore interval at said selected depth location for determining the actual flow rate of said flowing fluid therein.

21. The method of claim 20 wherein said selected travel speeds are respectively constant but unequal with respect to one another.

22. A method for determining the flow profile of fluids flowing in one or more selected well bore intervals with a flowmeter having a rotatable spinner adapted to turn in a rotational direction and at proportionally-related rotational speeds respectively representative of both the relative direction and the relative velocity of said flowing fluids with respect to said flowmeter and including speed-responsive means adapted for producing output signals indicative of said spinner speeds and comprising the steps of:
  passing said flowmeter at a selected travel speed between said selected well bore intervals and a lower interval of said well bore containing a static column of fluids and in a travel direction counter to said flowing fluids for obtaining one set of successive measurements respectively representative of the corresponding rotational speeds of said spinner in one of its said rotational directions in each of said selected well bore intervals and in said lower well bore interval;
  passing said flowmeter in the opposite travel direction between said selected well bore intervals and said lower well bore interval and at a selected travel speed which is always greater than the velocity of any of said flowing fluids for obtaining another set of measurements respectively representative of the corresponding rotational speeds of said spinner in the other of its said rotational directions in each of said selected well bore intervals and in said lower well bore interval;

plotting a first set of indicia representative of said measurements included in said one set thereof as a function of the successive depth locations of said flowmeter in said well bore as said measurements included in said one set thereof were respectively being obtained;

plotting a second set of indicia representative of said measurements included in said other set thereof as a function of the successive depth locations of said flowmeter in said well bore as said measurements included in said other set thereof were respectively being obtained; and superimposing those portions of said plotted first and second indicia respectively corresponding to those of said measurements obtained as said flowmeter passed through said lower well bore interval for laterally separating those portions of said plotted first and second indicia respectively corresponding to those of said measurements obtained as said flowmeter successively passed through each of said selected well bore intervals in proportion to the respective axial velocities of said flowing fluids in each of said selected well bore intervals.

23. The method of claim 22 wherein said selected travel speeds are respectively constant but unequal with respect to one another.

24. The method of claim 22 further including the step of:
determining the differentials between those portions of said first and second indicia respectively corresponding to those of said measurements obtained as said flowmeter successively passed through each of selected well bore intervals for respectively deriving a function representative of the axial velocity of said flowing fluids in each of said selected well bore intervals.

25. The method of claim 24 further including the step of:
multiplying each of said functions of said axial velocities by a factor of about 0.84 times the cross-sectional area of each of said selected well bore intervals for respectively determining functions of the actual flow rates of said flowing fluids in each of said selected well bore intervals.

26. The method of claim 24 further including the steps of:
obtaining a set of calibration measurements representative of the rate of change in rotational speed of said spinner for a known change in relative fluid velocity across said spinner; and
dividing said function representative of the axial velocity of said fluids flowing in each of said selected well bore intervals by a factor of twice said rate of change for determining the true axial velocity of said flowing fluids in each of said selected well bore intervals.

27. The method of claim 26 further including the step of:
multiplying each of said axial velocities by a factor of about 0.84 times the cross-sectional area of each of said selected well bore intervals for respectively determining the actual flow rates of said flowing fluids in each of said selected well bore intervals.

28. A method for determining the flow profile of fluids flowing in one or more selected well bore intervals with a flowmeter having a rotatable spinner adapted to turn in a rotational direction and at proportionally-related rotational speeds respectively representative of both the relative direction and the relative velocity of said flowing fluids with respect to said flowmeter and including speed-responsive means adapted for producing output signals indicative of said spinner speeds and comprising the steps of:

passing said flowmeter at a selected travel speed and in a travel direction counter to said flowing fluids between said selected well bore intervals and a higher interval in said well bore containing fluids flowing at a known velocity for obtaining one set of successive measurements respectively representative of the corresponding rotational speeds of said spinner in one of its said rotational directions in each of said selected well bore intervals and in said higher well bore intervals;

passing said flowmeter in the opposite travel direction between said selected well bore intervals and said higher well bore intervals and at a selected travel speed which is always greater than the velocity of any of said flowing fluids for obtaining another set of successive measurements respectively representative of the corresponding rotational speeds of said spinner in the other of its said rotational directions in each of said selected well bore intervals and in said higher well bore interval;

plotting a first set of indicia representative of said measurements included in said one set thereof as a function of the successive depth locations of said flowmeter in said well bore as said measurements included in said one set thereof were respectively being obtained;

plotting a second set of indicia representative of said measurements included in said other set thereof as a function of the successive depth locations of said flowmeter in said well bore as said measurements included in said other set thereof were respectively being obtained; and superimposing those portions of said plotted first and second indicia respectively corresponding to those of said measurements obtained as said flowmeter passed through said higher well bore interval for laterally separating those portions of said plotted first and second indicia respectively corresponding to those of said measurements obtained as said flowmeter successively passed through each of said selected well bore intervals in proportion to the respective axial velocities of said flowing fluids in each of said selected well bore intervals.

29. The method of claim 28 wherein said selected travel speeds are respectively constant but unequal with respect to one another.

30. The method of claim 28 further including the step of:
determining the differentials between those portions of said first and second indicia respectively corresponding to those of said measurements obtained as said flowmeter successively passed through each of selected well bore intervals for respectively deriving a function representative of the axial velocity of said flowing fluids in each of said selected well bore intervals.

31. The method of claim 39 further including the step of:
multiplying each of said functions of said axial velocities by a factor of about 0.84 times the cross-sectional area of each of said selected well bore intervals for respectively determining functions of the actual flow rates of said flowing fluids in each of said selected well bore intervals.

32. The method of claim 30 further including the steps of:
obtaining a set of calibration measurements representative of the rate of change in rotational speed of said spinner for a known change in relative fluid velocity across said spinner; and
dividing said function representative of the axial velocity of said fluids flowing in each of said selected well bore intervals by a factor of twice said rate of change for determining the true axial velocity of said flowing fluids in each of said selected well bore intervals.

33. The method of claim 32 further including the step of:
multiplying each of said axial velocities by a factor of about 0.84 times the cross-sectional area of each of said selected well bore intervals for respectively determining the actual flow rates of said flowing fluids in each of said selected well bore intervals.

* * * * *